United States Patent
Khan et al.

(10) Patent No.: US 11,687,825 B2
(45) Date of Patent: Jun. 27, 2023

(54) METHOD AND SYSTEM FOR DETERMINING RESPONSE TO QUERIES IN VIRTUAL ASSISTANCE SYSTEM

(71) Applicant: Wipro Limited, Bangalore (IN)

(72) Inventors: Ghulam Mohiuddin Khan, Bangalore (IN); Deepanker Singh, Meerut (IN); Sethuraman Ulaganathan, Tiruchirapalli (IN)

(73) Assignee: Wipro Limited, Bangalore (IN)

( * ) Notice: Subject to any disclaimer, the term of this patent is extended or adjusted under 35 U.S.C. 154(b) by 767 days.

(21) Appl. No.: 16/549,066

(22) Filed: Aug. 23, 2019

(65) Prior Publication Data
US 2020/0387825 A1  Dec. 10, 2020

(30) Foreign Application Priority Data
Jul. 10, 2019  (IN) .............................. 201941027581

(51) Int. Cl.
*G06N 20/00* (2019.01)
*G06F 16/335* (2019.01)
*G06F 16/35* (2019.01)

(52) U.S. Cl.
CPC ........... *G06N 20/00* (2019.01); *G06F 16/335* (2019.01); *G06F 16/35* (2019.01)

(58) Field of Classification Search
CPC .............................. G06F 16/35; G06F 16/335
See application file for complete search history.

(56) References Cited

U.S. PATENT DOCUMENTS

| 6,076,088 A | 6/2000 | Paik et al. |
| 8,346,563 B1 | 1/2013 | Hjelm et al. |
| 2015/0142704 A1 | 5/2015 | London |

OTHER PUBLICATIONS

Negi, S., et al. "Automatically Extracting Dialog Models from Conversation Transcripts", IEEE, 2009, pp. 890-895.

*Primary Examiner* — Jay A Morrison
(74) *Attorney, Agent, or Firm* — Finnegan, Henderson, Farabow, Garrett & Dunner, LLP

(57) ABSTRACT

The present invention discloses method and virtual assistance system for determining response to user queries. The virtual assistance system receives data comprising plurality of interaction between one or more users and one or more real agents for resolving query, where data is classified into user and real agent data. Entities and intent identified from each of the classified user data and real agent data are classified using predefined domain model. The entities and intent are combined to identify plurality of sequence of resolution data. Based on classification of entities and intent, virtual assistance system determines first set of resolution data and second set of resolution data. Thereafter, each of plurality of sequence of resolution data is clustered into one or more category associated with type of users, based on first set and second set of resolution data, parameters associated with users and historical resolution data used for responding to query.

13 Claims, 4 Drawing Sheets

METHOD AND SYSTEM FOR DETERMINING RESPONSE TO QUERIES IN VIRTUAL ASSISTANCE SYSTEM

TECHNICAL FIELD

The present subject matter is related in general to adaptive virtual assistance systems and learning, more particularly, but not exclusively to a method and system for determining response to queries in virtual assistance system.

BACKGROUND

Virtual assistant/agents are natural language applications which interact through natural language with a human user. With respect to said virtual assistant in particular, these applications perform functions similar to those provided by human assistant/experts. Typically, the virtual assistants may engage in conversations with users in order to perform functions such as, providing information, carrying out routine tasks, or performing other operations as required, similar to those performed by the human experts. Generally, for optimal effectiveness, the virtual-agents should acquire as well as extend user-specific knowledge for one or more domains during interaction between human experts and the user. The virtual agents store such knowledge therein for effectively utilizing said knowledge to guide users in next interaction corresponding to said one or more domains.

In some of existing techniques used for extending the knowledge of the virtual agents, new use cases and knowledge from various subject matter experts, language experts, data collection, validations, etc., are added manually from time to time to databases of the virtual agents in order to extend knowledge of a specific domain. This is a cumbersome and complex task and involves a lot of time and effort. Additionally, addition of such aforementioned new use cases and new knowledge, especially for upcoming technologies and application areas is difficult. This is due to a fact that training data and corpus for new technologies and application may not be readily available and requires a lot of curation for creation of an initial trainable corpus and subsequent integration into the virtual agents as a part of knowledge repository.

In some existing techniques, virtual intelligent agent service exists, which automatically extends knowledge of one or more domains through interaction with external resources such as, WordNet, Wolfram Alpha, Semantic Web, etc. Such techniques provide a complex architecture of the virtual assistant system and is a time-consuming process. Also, such virtual intelligent agent service lacks in any mechanism in which the virtual assistant system for virtual agents can be automated for leaning.

Thus, existing systems involve manual interventions and do not provide effective automatic scaling up of knowledge base of the virtual agents. Also, the existing systems lack mechanism to provide suitable set of resolution, when more than one set of resolutions are available for same query.

SUMMARY

In an embodiment, the present disclosure may relate to a method for determining response to queries in virtual assistance system. The method includes receiving data comprising a plurality of interaction between one or more users and one or more real agents for resolving a query. The data is classified into user data and real agent data. The method includes classifying one or more entities and intent identified from each of the classified user data and the real agent data using a predefined domain model. The one or more entities and the intent are combined to identify a plurality of a sequence of resolution data. Further, the method includes determining a first set of resolution data indicative of mandatory information required for resolving the query and a second set of resolution data indicative of supplementary information for resolving the query, based on the classification of the one or more entities and the intent. Thereafter, each of the plurality of sequence of resolution data is classified into one or more category associated with type of users, based on at least one of the first set of resolution data and the second set of resolution data, one or more parameters associated with the one or more users and parameters associated with historical resolution data used for responding to the query.

In an embodiment, the present disclosure may relate to a virtual assistance system for determining response to queries. The virtual assistance system may include a processor and a memory communicatively coupled to the processor, where the memory stores processor executable instructions, which, on execution, may cause the virtual assistance system to receive data comprising a plurality of interaction between one or more users and one or more real agents for resolving a query. The data is classified into user data and real agent data. The virtual assistance system classifies one or more entities and intent identified from each of the classified user data and the real agent data using a predefined domain model.

The one or more entities and the intent are combined to identify a plurality of a sequence of resolution data. Further, the virtual assistance system determines a first set of resolution data indicative of mandatory information required for resolving the query and a second set of resolution data indicative of supplementary information for resolving the query, based on the classification of the one or more entities and the intent. Thereafter, the virtual assistance system classifies each of the plurality of sequence of resolution data into one or more category associated with type of users, based on at least one of the first set of resolution data and the second set of resolution data, one or more parameters associated with the one or more users and parameters associated with historical resolution data used for responding to the query.

In an embodiment, the present disclosure relates to a non-transitory computer readable medium including instructions stored thereon that when processed by at least one processor may cause a virtual assistance system to receive data comprising a plurality of interaction between one or more users and one or more real agents for resolving a query. The data is classified into user data and real agent data. The instruction causes the processor to classify one or more entities and intent identified from each of the classified user data and the real agent data using a predefined domain model.

The one or more entities and the intent are combined to identify a plurality of a sequence of resolution data. Further, the instruction causes the processor to determine a first set of resolution data indicative of mandatory information required for resolving the query and a second set of resolution data indicative of supplementary information for resolving the query, based on the classification of the one or more entities and the intent. Thereafter, the instruction causes the processor to classify each of the plurality of sequence of resolution data into one or more category associated with type of users, based on at least one of the first set of resolution data and the second set of resolution data, one or more parameters associated with the one or more users and parameters associated with historical resolution data used for responding to the query.

The foregoing summary is illustrative only and is not intended to be in anyway limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
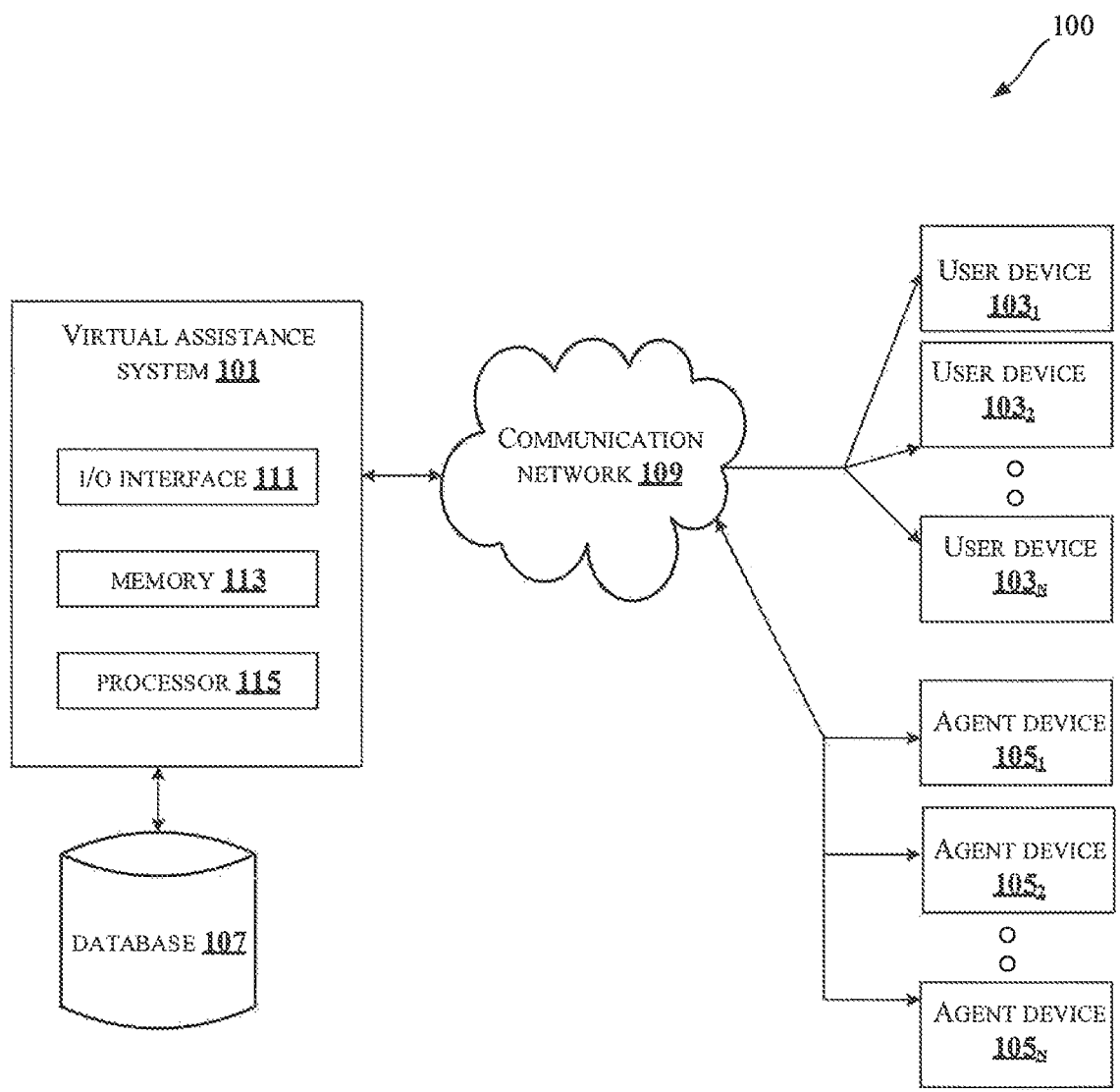
FIG. 1 illustrates an exemplary environment for determining response to queries in virtual assistance system in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure may relate to a method and a virtual assistance system for determining response to queries in virtual assistance system. In an embodiment, a virtual assistant is an application agent which understands natural language voice commands and completes tasks or services for users. Sometimes, term "chatbot" is used to refer to virtual assistant, generally or specifically accessed by online chat. Some virtual assistants are able to interpret human speech and respond via synthesized voices. The users may ask questions, control home automation devices and media playback via voice, and manage other basic tasks such as email, to-do lists, and calendars and other application with the virtual assistance systems. Typically, in some situations, existing virtual assistance system may not be able to provide resolution to users related to one or more domains.

In such situations, the users may be directed to take assistance from a real human expert, which is a manual process. Thus, in such scenarios, the present disclosure is trained to scale up knowledge/data in one or more domains where the virtual assistance system is not able to assist the users. The virtual assistant system utilises interaction data between different users and real-time agents. Particularly, the virtual assistance system determines resolution data for a query based on the interaction data and identifies context of each resolution data using a predefined trained domain model. The resolution data is clustered into one or more category associated with type of users, one or more parameters associated with the one or more users and parameters associated with historical resolution data used for responding to the query. Thus, the present disclosure learns and automatically scale up the virtual assistance system by adding new knowledge in one or more domains without involving manual intervention. This eliminates intervention of a real-time agent in addressing different queries of users.

FIG. 1 illustrates an exemplary environment for determining response to queries in virtual assistance system in accordance with some embodiments of the present disclosure.

As shown in FIG. 1, an environment 100 includes a virtual assistance system 101 connected through a communication network 109 to a user device $103_1$, user device $103_2$ . . . and user device $103_N$ (collectively referred as user devices 103) and an agent device 1051, an agent device $105_2$, . . . and an agent device 105N (collectively referred as agent devices 105). Further, the virtual assistance system 101 is connected to a database 107. The database 107 includes data related to different domain areas. The virtual assistance system 101 provides resolution for user queries. Particularly, the virtual assistance system receives queries from users through the user devices 103 in natural language, wherein the queries are interpreted in order to provide resolution for the queries. The communication network 109 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like.

In one embodiment, the virtual assistance system 101 may include, but is not limited to, a laptop, a desktop computer, a Personal Digital Assistant (PDA), a notebook, a smartphone, IOT devices, a tablet, a server, and any other computing devices. A person skilled in the art would understand that, any other devices, not mentioned explicitly, may also be used as the virtual assistance system 101 in the present disclosure. Further, the virtual assistance system 101 may include an I/O interface 111, a memory 113 and a processor 115. The I/O interface 111 may be configured to receive data from the database 107 and from the user devices 103 and the agent devices 105. The data from the I/O interface 111 may be stored in the memory 113. The memory 113 may be communicatively coupled to the processor 115 of the virtual assistance system 101. The memory 113 may also store processor instructions which may cause the processor 115 to execute the instructions for determining response to queries in the virtual assistance system 101.

The virtual assistance system 101 may train a predefined domain model using a plurality of training data associated with user and agent interaction by machine learning techniques. Considering a real-time situation, when a user requires assistance for a query for which resolution may not be available. In such case, the virtual assistance system 101 may request data from the database 107. The data is associated with interactions between one or more users and one or more real agents for resolving similar query raised in past by other one or more users. On receiving the data, the virtual assistance system 101 may classify the data into user data and real agent data. In an embodiment, the data is classified using unsupervised speech recognition models and the like.

Further, from the classified user data and the real agent data, the virtual assistance system 101 may classify one or more entities and intent using the predefined domain model. In an embodiment, the predefined domain model may include an entity classifier and an intent classifier which may be trained to classify the one or more entities and intent in the data. In an embodiment, the entity and the intent classifiers may be trained for custom data using machine learning/deep learning techniques or for data imported from a public or a private repository. The virtual assistance system 101 combines the one or more entities and the intent to identify a plurality of a sequence of resolution data. The one or more entities and the intent are classified based on common features. Thus, based on the classified one or more entities and the intent in the data, the virtual assistance system 101 may determine a first set of resolution data and a second set of resolution data.

The first set of resolution data relates to mandatory information required for resolving the query and the second set of resolution data includes supplementary information for resolving the query. In an embodiment, each of the first set of the resolution data and the second set of resolution data are classified based on number of times each data appeared during interaction with different users. For example, intents which are common between a plurality of resolution data may relate to the mandatory information and the intents which are not common or appear in fewer interactions may relate to the supplementary information.

Thus, the virtual assistance system 101 may classify each of the plurality of sequence of resolution data into one or more category associated with type of users. The classification is performed based on the first set of resolution data and the second set of resolution data, one or more parameters associated with the one or more users and parameters associated with historical resolution data provided by the real time agents for responding to the query. In an embodiment, the one or more category associated with type of users depends upon knowledge of the users in a domain related to the query.

For example, based on the knowledge of the user, the one or more category may be such as, novice-solution, beginner-solution, intermediate-solution, expert-solution, and the like. In an embodiment, the one or more parameters associated with the one or more users may include, but not limited to, location of users, skills, domain background, age, domain proficiency and time-taken by each user to follow and complete resolution provided by the one or more real agents. Further, the parameters associated with the historical resolution data may be time taken for resolving for each user query interaction, number of total steps provided by each real agent during the interaction and success rate of the resolution. The virtual assistance system 101 may store the one or more category of the resolution data for the query in the database 107 for future use.

Figure 2:
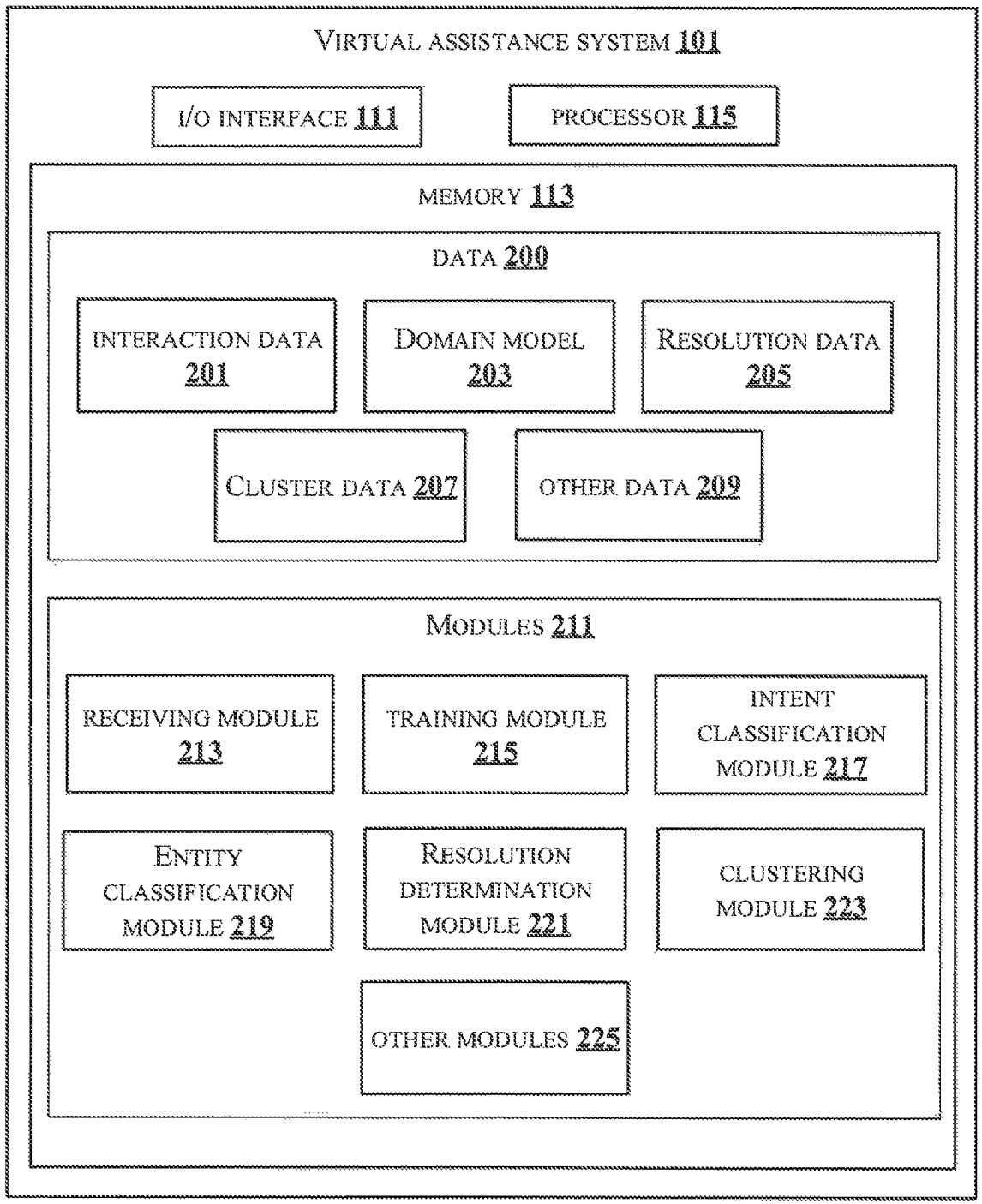
FIG. 2 shows a detailed block diagram of a virtual assistance system in accordance with some embodiments of the present disclosure.

FIG. 2 shows a detailed block diagram of a virtual assistance system in accordance with some embodiments of the present disclosure.

The virtual assistance system 101 may include data 200 and one or more modules 211 which are described herein in detail. In an embodiment, data 200 may be stored within the memory 113. The data 200 may include, for example, interaction data 201, domain model 203, resolution data 205, cluster data 207 and other data 209.

The interaction data 201 may include details on the interaction between the one or more users and the one or more real agents for responding to the query. In an embodiment, the interaction data 201 may be received from the database 107. Alternatively, in another embodiment, the interaction data 201 may be received from the users and real agents through respective user devices 103 and the agent devices 105. The details on the interaction may include the query of the user, one or more questions requested by the real agents and responses/intermediate responses provided by the users. The interaction data 201 includes video call, images and annotations shared in call, audio information exchanged between the user and agent and the like.

The domain model 203 may include the predefined domain model. The predefined domain model includes the intent classifier and the entity classifier. In an embodiment, the entity classifier may be a neural network which may be trained to extract named entities from corresponding domain. Similarly, the intent classifier may be trained using statement as an input which may be mapped to one of the intents which can be used in the domain.

The resolution data 205 may include the first set of resolution data and the second set of the resolution data. Particularly, the first set of resolution data may include a plurality of mandatory information required for resolving the query. Similarly, the second set of resolution data includes a plurality of supplementary information required for resolving the query. For example, the supplementary information may include data such as, tips, precautions, additional information, and the like for the user.

The cluster data 207 may include the plurality of resolution data clustered in to the one or more category. For example, the plurality of resolution data is clustered into one or more category indexed from "0 to N", where "0" may relate to most straightforward resolution step without any supplementary information and "N" being detailed resolution data.

The other data 209 may store data, including temporary data and temporary files, generated by modules 211 for performing the various functions of the virtual assistance system 101.

In an embodiment, the data 200 in the memory 113 are processed by the one or more modules 211 present within the memory 113 of the virtual assistance system 101. In an embodiment, the one or more modules 211 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 211 may be communicatively coupled to the processor 115 for performing one or more functions of the virtual assistance system 101. The said modules 211 when configured with the functionality defined in the present disclosure will result in a novel hardware.

In one implementation, the one or more modules 211 may include, but are not limited to a receiving module 213, a training module 215, an intent classification module 217, an entity classification module 219, a resolution determination module 221 and a clustering module 223. The one or more modules 211 may also include other modules 225 to perform various miscellaneous functionalities of the virtual assistance system 101.

In an embodiment, the other modules 225 may include a data classification module, a combining module and a learning module. The data classification module may classify the data received from the database 107 into user data and the real agent data using unsupervised speech recognition models. The data is classified by analyzing context of the conversation, analyzing request of the one or more agent for status of execution of last instruction, analyzing response of the one or more users for such request and the like. The combining module may combine the classified one or more entities and intent to obtain the sequence of resolution data. Particularly, the combining module arranges and fuses the one or more intents and entities. The criteria for fusing more than one intent and entities is to identify a chain of pre-requisite intent/entity from the agent and user data for the next intent/entity. Thereafter, the combining module arranges multiple steps into an order to obtain the sequence of resolution data. The learning module may learn the one or more category of clustered resolution data.

The receiving module 213 may receive the data associated with the interaction between the one or more users and the real agents for the query from the database 107. The data may be received when the resolution data 205 for the query is not available. Alternatively, the receiving module 213 may receive the interaction data 201 in real-time from the one or more user devices 103 and the agent devices 105.

The training module 215 may train the predefined domain model based on data obtained for one or more domains. The predefined domain model may include the entity classifier and the intent classifier. The training module 215 may train for custom data using various machine learning/deep learning techniques or may be imported from the public or the private repository. In an embodiment, the entity classifier may be trained to extract the named entities from corresponding domain. The entity classifier may be used to extract entity(s) or interested component(s) from a portion of data. For instance, the entity classifier may be trained with input as the statements from the agents with named entities being annotated (underlined) in the data. For example, in laptop hardware related scenarios, "Please remove hard drive using a plastic scribe." Similarly, the intent classifier may be trained using statement as the input which may be mapped to one of the intents which can be used in the domain. For example, in the statement, "Please remove the hard drive using a plastic scribe.", removing the hard drive is the intent.

The intent classification module 217 may classify the user data and the agent data classified by the data classification module into one or more intent using the predefined domain model in the intent classifier. In an embodiment, the intent for a step may include but are not limited to actions being performed for the query, cautions being given by the agents, tips being provided by the agent, pre-conditions being provided by the agent before starting any step and the like.

The entity classification module 219 may classify the user data and the agent data classified by the data classification module into one or more entities using the predefined domain model in the entity classifier. In an embodiment, the entities may include but are not limited to, components used in a data, gerunds describing key-actions (Example, agent says, "You have now plug the laptop to a power source for charging", here 'Charging' is the gerund entity here.).

The resolution determination module 221 may determine the first set of resolution data and the second set of the resolution data based on the classified one or more entities and the intent. The first set of resolution data includes the mandatory information which are required for resolving the query and the second set of resolution data includes the supplementary information. For example, the intent which are common between all the sequence of resolution data are regarded as mandatory information. The intent which are not common or appears in fewer data may be considered as the supplementary data. In an embodiment, the supplementary data may help users who may have less knowledge of the domain and/or are relatively inexperienced. Further, the supplementary data may act as tips and precautions for inexperienced as well the experienced users.

The clustering module 223 may cluster each of the plurality of sequence data into the one or more category associated with type of users. The clustering is performed based on at least the first set of resolution data and the second set of resolution data, the one or more parameters associated with the one or more users and the parameters associated with the historical resolution data used for responding to the query.

For example, the plurality of resolution data is clustered into one or more category indexed from "0 to N", where "0" may relate to most straightforward resolution step without any supplementary information and "N" being detailed resolution data. The indexes (from "0 to N") may be used to serve the users based on their knowledge or awareness about the domain and query. The one or more parameters associated with the one or more users is based on contextual information if available such as, location of users, skills, domain background, age, domain proficiency and time-taken by each user to follow and complete resolution provided by the one or more real agents. Further, the parameters associated with the historical resolution data may include the time taken for resolving for each user query interaction, number of total steps provided by each real agent during the interaction and success rate of the resolution.

Exemplary Scenario:

Consider a scenario for resolving a query in a domain of laptop devices with respect to hard drive replacement. Resolution for replacing the hard drive need to be learned automatically according to multiple level of solution complexities. For instance, considering two levels of complexities, i.e., resolution data for novice user and resolution data for expert users. Thus, considering a situation where a user makes a query for resolution data for removing hard drive for a particular model of laptop. In such case, the virtual assistance system 101 may try to find an appropriate resolution data in the database 107.

However, search in the database 107 exhausts without any match. In such case, the virtual assistance system 101 may find a real agent from the laptop domain and connects the user directly to the real agent. The interaction between the user (consider, user has a sufficient exposure to laptop hardware problems) and the agent is recorded. The interaction data 201 may include "Remove the AC adapter from the system, remove the battery, remove the bottom door, remove the four screws securing the hard drive to hard drive compartment, remove the hard drive cable. [Additional AR data, audio data, images, etc.]. Disconnect, the interposer card (HDD connector) from the HDD assembly. [Additional AR data, audio data, images, etc.] Open the four screws securing hard drive to the HDD bracket and take the hard drive out".

Similarly, another user makes a same query in the laptop domain. This user is a novice to the laptop hardware domain (for example, user context is analyzed to find proficiency of the user in the domain) made same query. The interaction data 201 between the novice user and the agent is recorded as "Remove the AC adapter from the system, slide the battery latch, which is securing the battery lock. [Additional AR data, audio data, images, etc., remove the battery from the battery compartment, remove the two screws securing the bottom door. [Additional AR data, audio data, images, etc.]. Using plastic scribe to pry or release the bottom door, remove the four screws securing the hard drive to hard drive compartment. [Additional AR data, audio data, images, etc.], remove the hard drive cable from the motherboard and take out the hard drive assembly. [Additional AR data, audio data, images, etc.]. Disconnect the interposer card (HDD connector) from the HDD assembly. [Additional AR data, audio data, images, etc.]. Open the four screws securing hard drive to the HDD bracket and take the hard drive out. [Additional AR data, audio data, images, etc.]".

After collecting the interaction data 201 from the above two conversations, the virtual assistance system 101 analyses user-context. Auxiliary information, as mentioned in data above is extracted and analysed. The virtual assistance system 101 clusters the resolution data based on complexity of the interaction data 201. In an embodiment, once a threshold is achieved in terms of the clusters and the information associated with them, new use case is added to the virtual assistance system 101 for the query.

Figure 3:
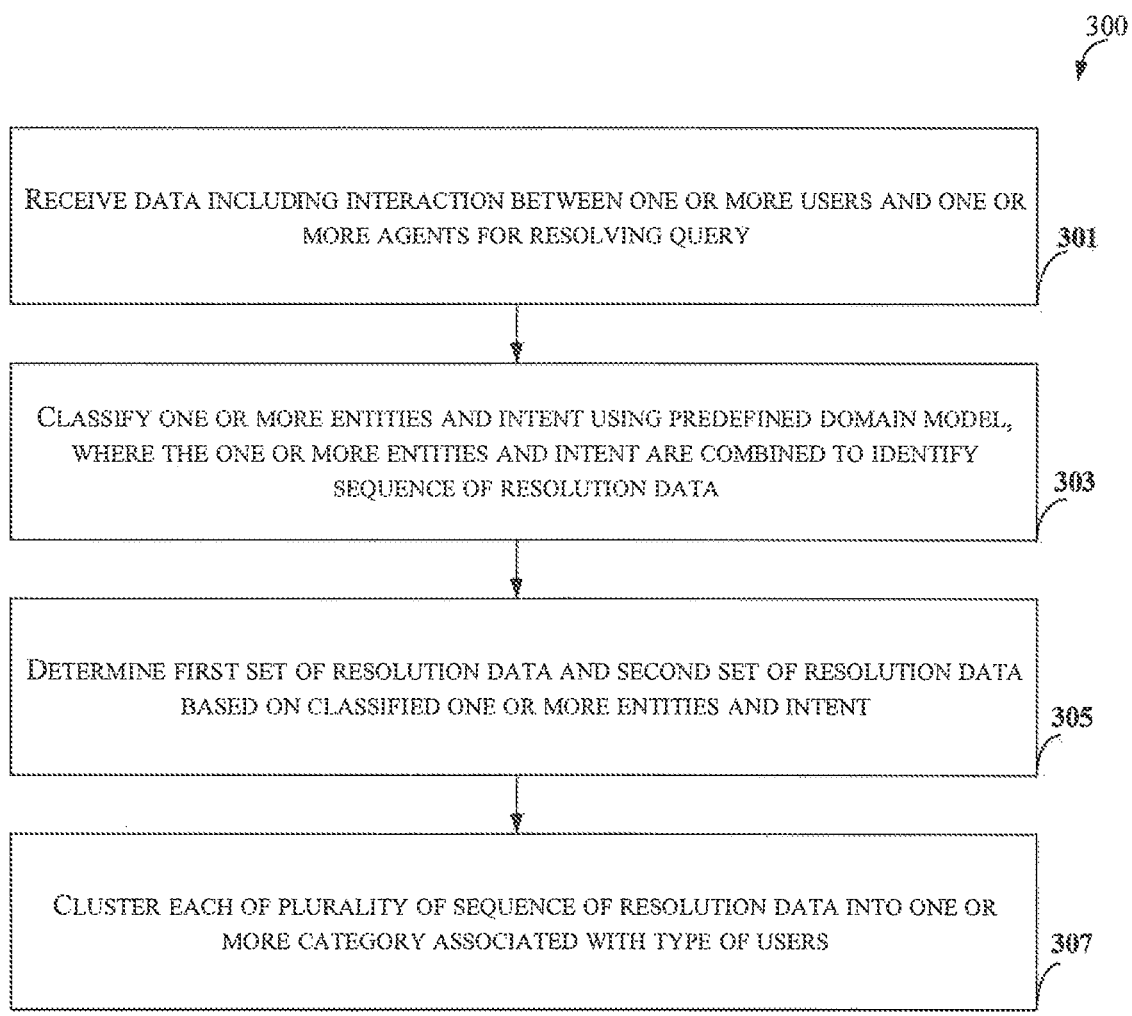
FIG. 3 illustrates a flowchart showing a method for determining response to queries in virtual assistance system in accordance with some embodiments of present disclosure.

FIG. 3 illustrates a flowchart showing a method for determining response to queries in virtual assistance system in accordance with some embodiments of present disclosure.

As illustrated in FIG. 3, the method 300 includes one or more blocks for determining response to queries in virtual assistance system 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the data regarding the plurality of interaction between the one or more users and the one or more real agents is received by the receiving module 213 for resolving the query. The data is classified into user data and real agent data.

At block 303, the one or more entities and intent is classified using the predefined domain model 203. The one or more entities and the intent are combined to identify the plurality of the sequence of resolution data.

At block 305, the first set of resolution data indicative of mandatory information required for resolving the query and a second set of resolution data indicative of supplementary information is determined by the resolution determination module 221 for resolving the query based on the classification of the one or more entities and the intent.

At block 307, each of the plurality of sequence of resolution data is clustered by the clustering module 223 into one or more category associated with type of users, based on at least one of the first set of resolution data and the second set of resolution data, one or more parameters associated with the one or more users and parameters associated with historical resolution data used for responding to the query.

Figure 4:
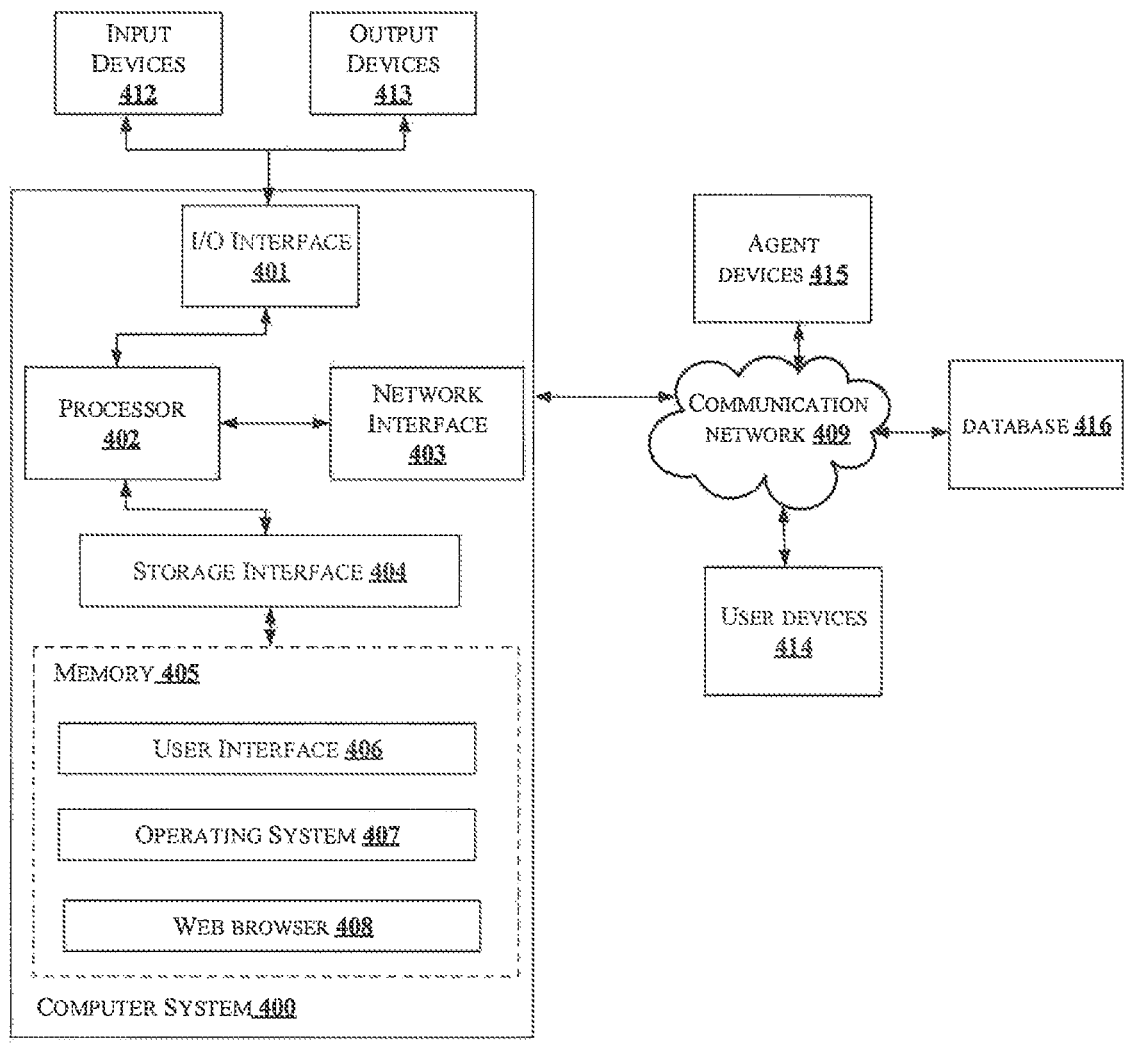
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be used to implement the virtual assistance system 101. The computer system 400 may include a central processing unit ("CPU" or "processor") 402. The processor 402 may include at least one data processor for determining response to queries in virtual assistance system 101. The processor 402 may include specialized processing units such as, integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices such as input devices 412 and output devices 413. For example, the input devices 412 may be an antenna, keyboard, mouse, joystick, (infrared) remote control, camera, card reader, fax machine, dongle, biometric reader, microphone, touch screen, touch-pad, trackball, stylus, scanner, storage device, transceiver, video device/source, etc. The output devices 413 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 400 consists of the virtual assistance system 101. The processor 402 may be disposed in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 403 and the communication network 409, the computer system 400 may communicate with user devices 414 and agent devices 415 and a database 416. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 409 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 3) via a storage interface 404. The storage interface 404 may connect to memory 405 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407 etc. In some embodiments, computer system 400 may store user/application data, such as, the data, variables, records, etc., as described in this disclosure. Such databases may be implemented as fault-tolerant, relational, scalable, secure databases such as Oracle or Sybase.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLER ANDROID™, BLACKBERRY® OS, or the like.

In some embodiments, the computer system 400 may implement a web browser 408 stored program component. The web browser 408 may be a hypertext viewing application, for example MICROSOFT® INTERNET EXPLORER™, GOOGLE CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX™, DHTML™, ADOBE® FLASH™, JAVASCRIPT™, JAVA™, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provides an improved virtual assistant system that can automatically extend the knowledge and in addition provides multi-step guidance solutions against user's queries without any manual intervention.

In an embodiment, the improved virtual assistant system is configured to understand the user's context knowledge to serve multi-step guidance solutions that corresponds to said user's prior knowledge of the domain and therefore serves the user better.

In an embodiment, the present disclosure comprises a learning module that provides a domain-based corpus to normalize solution steps provided by the agent.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries.

A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices.

An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Environment |
| 101 | Virtual assistance system |
| 103 | Plurality of user devices |
| 105 | Plurality of agent devices |
| 107 | Database |
| 109 | Communication network |
| 111 | I/O interface |
| 113 | Memory |
| 115 | Processor |
| 200 | Data |
| 201 | Interaction data |
| 203 | Domain model |
| 205 | Resolution data |
| 207 | Cluster data |
| 209 | Other data |
| 211 | Modules |
| 213 | Receiving module |
| 215 | Training module |
| 217 | Intent classification module |
| 219 | Entity classification module |
| 221 | Resolution determination module |
| 223 | Clustering module |
| 225 | Other modules |
| 400 | Computer system |
| 401 | I/O interface |
| 402 | Processor |
| 403 | Network interface |
| 404 | Storage interface |
| 405 | Memory |
| 406 | User interface |
| 407 | Operating system |
| 408 | Web browser |
| 409 | Communication network |
| 412 | Input devices |
| 413 | Output devices |

-continued

| Reference number | Description |
| --- | --- |
| 414 | User devices |
| 415 | Agent device |
| 416 | Database |

What is claimed is:

1. A method of determining response to queries in virtual assistance system, the method comprising:
receiving, by a virtual assistance system, data comprising a plurality of interactions between one or more users and one or more real agents for resolving a query, wherein the data is classified into user data and real agent data;
classifying, by the virtual assistance system, one or more entities and intent identified from each of the classified user data and the real agent data using a predefined domain model, wherein the one or more entities and the intent are combined to identify a plurality of a sequence of resolution data, and wherein the predefined domain model is trained using a plurality of training data associated with user and agent interaction in one or more domains by machine learning techniques, wherein the plurality of training data is annotated with one or more entities and intent, and wherein the predefined domain model comprises an entity classifier and an intent classifier, the entity classifier being a neural network trained to extract named entities from corresponding domain and the intent classifier being trained using statement as an input which is mapped to one of intents which can be used in a domain;
determining, by the virtual assistance system, a first set of resolution data indicative of mandatory information required for resolving the query and a second set of resolution data indicative of supplementary information for resolving the query, based on the classification of the one or more entities and the intent; and
clustering, by the virtual assistance system, each of the plurality of sequence of resolution data into one or more category associated with type of users, based on at least one of the first set of resolution data and the second set of resolution data, one or more parameters associated with the one or more users and parameters associated with historical resolution data used for responding to the query.

2. The method as claimed in claim 1, wherein each of the first set of resolution data and the second set of resolution data are classified based on number of times each data appeared during interaction with different users.

3. The method as claimed in claim 1, wherein the one or more category associated with type of users depends upon knowledge of the users in a domain related to the query.

4. The method as claimed in claim 1, wherein the one or more parameters associated with the one or more users comprises location of users, skills, domain background, age, domain proficiency and time-taken by each user to follow and complete resolution provided by the one or more real agents.

5. The method as claimed in claim 1, wherein the parameters associated with the historical resolution data comprises time taken for resolving for each user query interaction, number of total steps provided by each real agent during the interaction and success rate of the resolution.

6. The method as claimed in claim 1 further comprising storing each of the plurality of sequence of resolution data based on the one or more category in a database associated with the virtual assistance system.

7. A virtual assistance system for determining response to queries, comprising:
a processor; and
a memory communicatively coupled to the processor, wherein the memory stores processor instructions, which, on execution, causes the processor to:
receive data comprising a plurality of interaction between one or more users and one or more real agents for resolving a query, wherein the data is classified into user data and real agent data;
classify one or more entities and intent identified from each of the classified user data and the real agent data using a predefined domain model, wherein the one or more entities and the intent are combined to identify a plurality of a sequence of resolution data, and wherein the predefined domain model is trained using a plurality of training data associated with user and agent interaction in one or more domains by machine learning techniques, wherein the plurality of training data is annotated with one or more entities and intent, and wherein the predefined domain model comprises an entity classifier and an intent classifier, the entity classifier being a neural network trained to extract named entities from corresponding domain and the intent classifier being trained using statement as an input which is mapped to one of intents which can be used in a domain;
determine a first set of resolution data indicative of mandatory information required for resolving the query and a second set of resolution data indicative of supplementary information for resolving the query, based on the classification of the one or more entities and the intent; and
cluster each of the plurality of sequence of resolution data into one or more category associated with type of users, based on at least one of the first set of resolution data and the second set of resolution data, one or more parameters associated with the one or more users and parameters associated with historical resolution data used for responding to the query.

8. The virtual assistance system as claimed in claim 7, wherein the processor classifies each of the first set of resolution data and the second set of resolution data based on number of times each data appeared during interaction with different users.

9. The virtual assistance system as claimed in claim 7, wherein the one or more category associated with type of users depends upon knowledge of the users in a domain related to the query.

10. The virtual assistance system as claimed in claim 7, wherein the one or more parameters associated with the one or more users comprises location of users, skills, domain background, age, domain proficiency and time-taken by each user to follow and complete resolution provided by the one or more real agents.

11. The virtual assistance system as claimed in claim 7, wherein the parameters associated with the historical resolution data comprises time taken for resolving for each user query interaction, number of total steps provided by each real agent during the interaction and success rate of the resolution.

12. The virtual assistance system as claimed in claim 7 further comprising storing each of the plurality of sequence of resolution data based on the one or more category in a database associated with the virtual assistance system.

13. A non-transitory computer readable medium including instructions stored thereon that when processed by at least one processor causes a virtual assistance system to perform operations comprising:

receiving data comprising a plurality of interaction between one or more users and one or more real agents for resolving a query, wherein the data is classified into user data and real agent data;

classifying one or more entities and intent identified from each of the classified user data and the real agent data using a predefined domain model, wherein the one or more entities and the intent are combined to identify a plurality of a sequence of resolution data, and wherein the predefined domain model is trained using a plurality of training data associated with user and agent interaction in one or more domains by machine learning techniques, wherein the plurality of training data is annotated with one or more entities and intent, and wherein the predefined domain model comprises an entity classifier and an intent classifier, the entity classifier being a neural network trained to extract named entities from corresponding domain and the intent classifier being trained using statement as an input which is mapped to one of intents which can be used in a domain;

determining a first set of resolution data indicative of mandatory information required for resolving the query and a second set of resolution data indicative of supplementary information for resolving the query, based on the classification of the one or more entities and the intent; and clustering each of the plurality of sequence of resolution data into one or more category associated with type of users, based on at least one of the first set of resolution data and the second set of resolution data, one or more parameters associated with the one or more users and parameters associated with historical resolution data used for responding to the query.

\* \* \* \* \*